US 6,651,190 B1

(12) United States Patent
Worley et al.

(10) Patent No.: US 6,651,190 B1
(45) Date of Patent: Nov. 18, 2003

(54) INDEPENDENT REMOTE COMPUTER MAINTENANCE DEVICE

(75) Inventors: Christian B. Worley, Salt Lake City, UT (US); Allan L. Worley, Grand Junction, CO (US)

(73) Assignees: A. Worley, Grand Junction, CO (US); C. Worley, Salt Lake City, UT (US)

( * ) Notice: Subject to any disclaimer, the term of this patent is extended or adjusted under 35 U.S.C. 154(b) by 0 days.

(21) Appl. No.: 09/525,776

(22) Filed: Mar. 14, 2000

(51) Int. Cl.[7] .................................................. G06F 11/30
(52) U.S. Cl. ............................ 714/43; 714/27; 709/224
(58) Field of Search ............................. 714/27, 57, 31, 714/46, 43, 4; 709/223, 224

(56) References Cited

U.S. PATENT DOCUMENTS

| | | | |
|---|---|---|---|
| 5,347,646 A | 9/1994 | Hirosawa et al. | |
| 5,404,541 A | 4/1995 | Hirosawa et al. | |
| 5,410,706 A | 4/1995 | Farrand et al. | |
| 5,455,933 A | 10/1995 | Schieve et al. | |
| 5,712,978 A | 1/1998 | Lerner et al. | |
| 5,732,268 A | 3/1998 | Bizzarri | |
| 5,815,652 A | 9/1998 | Ote et al. | |
| 5,859,778 A | 1/1999 | Kuroda et al. | |
| 5,909,480 A | 6/1999 | Reynaud et al. | |
| 5,961,594 A | * 10/1999 | Bouvier et al. | 709/223 |
| 6,175,934 B1 | * 1/2001 | Hershey et al. | 714/25 |
| 6,278,919 B1 | * 8/2001 | Hwang et al. | 307/10.6 |
| 6,338,150 B1 | * 1/2002 | Johnson et al. | 714/39 |
| 6,438,711 B2 | * 8/2002 | Woodruff | 714/27 |

OTHER PUBLICATIONS

IBM, "IBM Remote Supervisor Adapter", 2001, Brochure.*
Intel, "Intel LANDesk Server Manager Products", 1999, Brochure.*
Intel, *Purpose-Built N440BX and T440BX Server Boards, Configuration and Operating Summary of the Emergency Management Port*, Aug. 6, 1998, Rev. 1.5, pp. 1–7.

* cited by examiner

Primary Examiner—Scott Baderman (57) ABSTRACT

A remote maintenance device for monitoring and controlling a host computer and its operating system. The device is fully independent of the host computer's hardware and peripherals (including local power, network, and telephony) and fully independent of the host operating system. The remote maintenance device uses a wireless modem (GSM) or wireless IP (packet) interface to provide commands from a remote technician to the remote maintenance device. The wireless communication link also transfers data to a remote technician who can then diagnose problems. The host computer may be reset and the power toggled on and off without affecting the maintenance-device's operation because of an onboard battery. The maintenance devices accesses the host's operating system and BIOS via serial ports, I2C, ethernet, and similar communication connections. Host system monitoring includes connecting to and capturing the temperature sensing, fan speeds, voltage sensors, serial port I/O for low-level text and IP access to the BIOS, operating system and boot logs, keyboard/video capture and control, LAN access for testing local connectivity, secondary "back door" IP access, and other peripherals. This device is totally unaffected by failure of the CPU, motherboard, power supply, physical room power, UPS power availability, and the network. In addition, the maintenance device interfaces with, but is not affected by, I/O cards, external network switches and hubs, and local physical Internet or telephony lines, and various adapter cards. Separate operating software is used to operate the independent maintenance device which separates it from software corruption on the host computer.

31 Claims, 4 Drawing Sheets

FIG. 4

INDEPENDENT REMOTE COMPUTER MAINTENANCE DEVICE

TECHNICAL FIELD

This invention relates generally to the field of remote management of computer systems, and more particularly to remotely managing computer systems with an independent computing device which is contained in or coupled to a host computer system.

BACKGROUND

Many organizations are now very dependent on computers for the management of their data. Because of the mission critical nature of computer applications like web servers, accounting, point of sale, inventory and customer information, even small organizations need their computer systems to be running virtually all the time. Although organizations desire to maintain their computer systems 24 hours a day, it can be difficult to continually have computer technicians on-site round the clock. There are also many small businesses which do not have a full time technician on-site to service their computer systems.

In other situations, the computer hardware is remotely located in an area which is hard to access. For example, a server may be locked into a physically secure room or located at a third party site such as an Internet provider, telecommunications carrier, or the telephone utility. When the server or computer is located at a third party site, it is difficult to access because of its remote location and the permission needed to access the physical computer box.

It is not uncommon for companies to employ a technician at a central site which services a number of other geographical sites owned by the company. In these situations, it is difficult for the technician to be on-site when a computer problem arises. The remote technician would like to be able to access the remote computers and repair any problems without actually physically visiting the machine. In these situations, there may even be a user who can sit at the keyboard and enter commands as delivered over the phone. The drawback to this type of arrangement is that the user must be computer literate or the technician cannot communicate the required changes to them over the phone.

When a computer system does not respond to the needs of computer users, they will normally call the technician and describe the problem. Typically, the user does not know what is wrong but they inform the technician that they cannot connect to the Internet, the server is not working or that they cannot send e-mail. If the technician is on-site, it is a simple matter to access the computer console and fix the problem. When the technician is off-site or the problem occurs after regular working hours, the technician will have to travel to the site and then correct the problem. The travel required can be a serious inconvenience, especially if a problem occurs in the middle of the night. Sometimes the technician will be paged by a warning device which cannot tell what the problem actually is.

Devices do exist which allow for some remote operation and diagnosis of computers, but these devices have inevitably been tied into the overall functioning of the computer. In other words, if the operating system software has crashed, the telephone lines are down, or there is no power then the diagnostic system will not work. An example of this is U.S. Pat. No. 5,455,933 to Schieve which is a Circuit and Method for Remote Diagnosis of Personal Computers. The Schieve system requires the presence and proper functioning of the PC's modem for remote diagnosis to take place. This modem is coupled to the CPU via a universal asynchronous receive/transmit module (UART). If the power to the motherboard is gone, the modem software has been corrupted, or the telephone lines are disabled then no contact can be made with the computer.

Other systems such as U.S. Pat. No. 5,347,646 to Hirosawa continually diagnose the state of the computer and then send a message to the technician if there is a problem. Specifically, Hirosawa supervises the data stream on the data transmission/reception signal line existing between the computer system and the master console. An error in the system is messaged through the land based public telephone line. A similar device, U.S. Pat. No. 5,732,268 to Bizzarri, teaches extended BIOS to establish remote communication for diagnostics. In the Bizzarri invention, if there is a problem in the booting sequence then the BIOS automatically establish a communication link through a modem or a local area network (LAN) connection. Bizzarri has the problem that without power to the computer, then there is no notification. In addition, if there is a problem with the LAN, ISDN, or the land based telephone lines then no notification will be made. Since Bizzarri is focused on BIOS control, it offers no insight into the state of a partially disabled operating system.

Another disadvantage with devices that send notifications to a system administrator is the messages are usually quite cryptic. Usually, the user must physically access the computer to diagnose the problem. These types of devices are akin to an alarm system. The system administrator knows there is a problem but does not necessarily know what it is or how to fix it. Even if an error message is sent, diagnosis will be required. Diagnostic notification triggered by pre-programmed events usually assumes that the operator knows what problems will occur. In contrast, computer failures often manifest themselves in new and unforeseen ways. Additionally, event/alarm systems are frequently affected by the failure. Often a failure causes the event alarm system to fail before the alarm can even be registered.

Some prior art devices also allow for the power to be remotely controlled, such as U.S. Pat. No. 5,404,541 Hirosawa. The prior art patents cited above are all incorporated by reference herein. There are also other devices such as the Intel N44OBX and T44OBX server boards which allow for the power and the reset to be initiated through a land based modem line. These devices have the drawback that if the phone line is not accessible or no power is available to the machine or modem, then no diagnosis may be made. The Intel device is not independent of the motherboard power and it focuses on BIOS diagnostics and does not provide for interactive trouble shooting of the system's operating system or other higher level services such as the network or TCP/IP connectivity (Transmission Control Protocol/Internet Protocol). Such a device is a limited tool for diagnosing problems remotely Accordingly, it would be an improvement over the state of the art to provide a new apparatus and method for remotely monitoring and accessing a computer which is independent from the host computer's power, and includes independent, robust access and diagnostics.

OBJECTS AND SUMMARY OF THE INVENTION

It is an object of the present invention to provide an independent computing device for diagnosing and repairing a host computer.

It is another object of the present invention to provide an independent computing device for diagnosing a host microcomputer when no power is supplied to the host computer.

It is another object of the present invention to provide an independent computing device for independent diagnosis and recovery when the software or hardware of the host computer is not operating properly.

It is yet another object of the present invention to provide an independent computing device for independent diagnosis and recovery when a land based telecommunications line or local area network connection is not operating properly.

This invention is a remote maintenance device for monitoring and controlling a host computer and its operating system. The device allows a remote administrator the same functionality as if they were sitting at the host's console. The device is fully independent of the host computer's hardware and peripherals (including local power, network, and telephony) and fully independent of the host operating system and BIOS. The remote maintenance device uses a wireless modem (GSM) or wireless IP (packet) interface to provide commands from a remote technician to the host computer. The wireless communication link also transfers output or display data to the remote technician who can then diagnose and repair problems. Because of an onboard battery, the host computer may be reset and the power toggled on and off without affecting the maintenance device's operation. The maintenance device accesses the host's operating system and BIOS via serial ports and similar communication connections.

Host system monitoring includes connecting to and capturing: temperature sensors, fan speed sensors, voltage sensors, serial port I/O for low-level text and IP access to the BIOS, the operating system, keyboard/video capture and control, LAN access for testing local connectivity, secondary "back door" IP access, and other peripherals. The present invention is totally unaffected by the failure of the CPU, motherboard, power supply, physical room power, UPS power availability, host software, or the network. In addition, the maintenance device interfaces with (but is not affected by) I/O cards, external network switches, routers, gateways, and hubs, local physical Internet, telephony lines, and various adapter cards. Separate operating software is used to operate the independent maintenance device which isolates it from any software problems on the host computer.

The presently preferred embodiment of the invention is a remote maintenance computing device for monitoring and controlling the host computer's hardware and operating system. The device includes communication interfaces for the host computer and a microprocessor coupled to the host computer's communication interfaces to monitor the host. A wireless communication connection is coupled to the microprocessor to transmit data regarding the present state of the host computer's hardware and software. An independent, possibly continuously recharging, power source is wired to the microprocessor and wireless communication connection. A remote receiver or remote computer receives the data transmitted by the wireless communication connection and transmits commands to the microprocessor through the wireless communication connection.

These and other objects, features, advantages and alternative aspects of the present invention will become apparent to those skilled in the art from a consideration of the following detailed description taken in combination with the accompanying drawings.

DISCLOSURE OF THE INVENTION

Reference will now be made to the drawings in which the various elements of the present invention will be given numerical designations and in which the invention will be discussed so as to enable one skilled in the art to make and use the invention. It is to be understood that the following description is only exemplary of certain embodiments of the present invention, and should not be viewed as narrowing the claims which follow.

Computer users desire to be able to use a computer or server at all times. The best example of this is an Internet server or website where the owner wants the site to be continually accessible to users. When the Internet services or other information services on a server are inaccessible, the users or customers call the service technician or system administrator to complain. When a critical computer is not working properly, it is very valuable to have access from another remote computer or interface. For example, remote centralized control allows a host computer to be reset or restarted. Ad hoc remote commands and analysis eliminate the need for dispatching personnel to the on-site computer, and this in turn reduces the management cost and down time. It is also beneficial to be able to independently access information indicating the occurrence of a malfunction and then investigate the cause of the trouble. This information exchange shortens the time required for troubleshooting or restarting the machine by the technician. Remote computer control and maintenance also reduces the cost of computer upkeep and the cost of employing servicing personnel. Server down time also causes loss of productivity by the system users. Since a technician is rarely required to physically access the disabled computer, more technicians can service more computers, resulting in additional savings.

The primary goal of this device is to provide a remote maintenance interface to monitor and control a host computer and it's operating system. This independent remote monitoring computer is fully independent of the host computer's hardware and peripherals (including local power, network, host software, and telephony) and fully independent of the host operating system.

Figure 1:
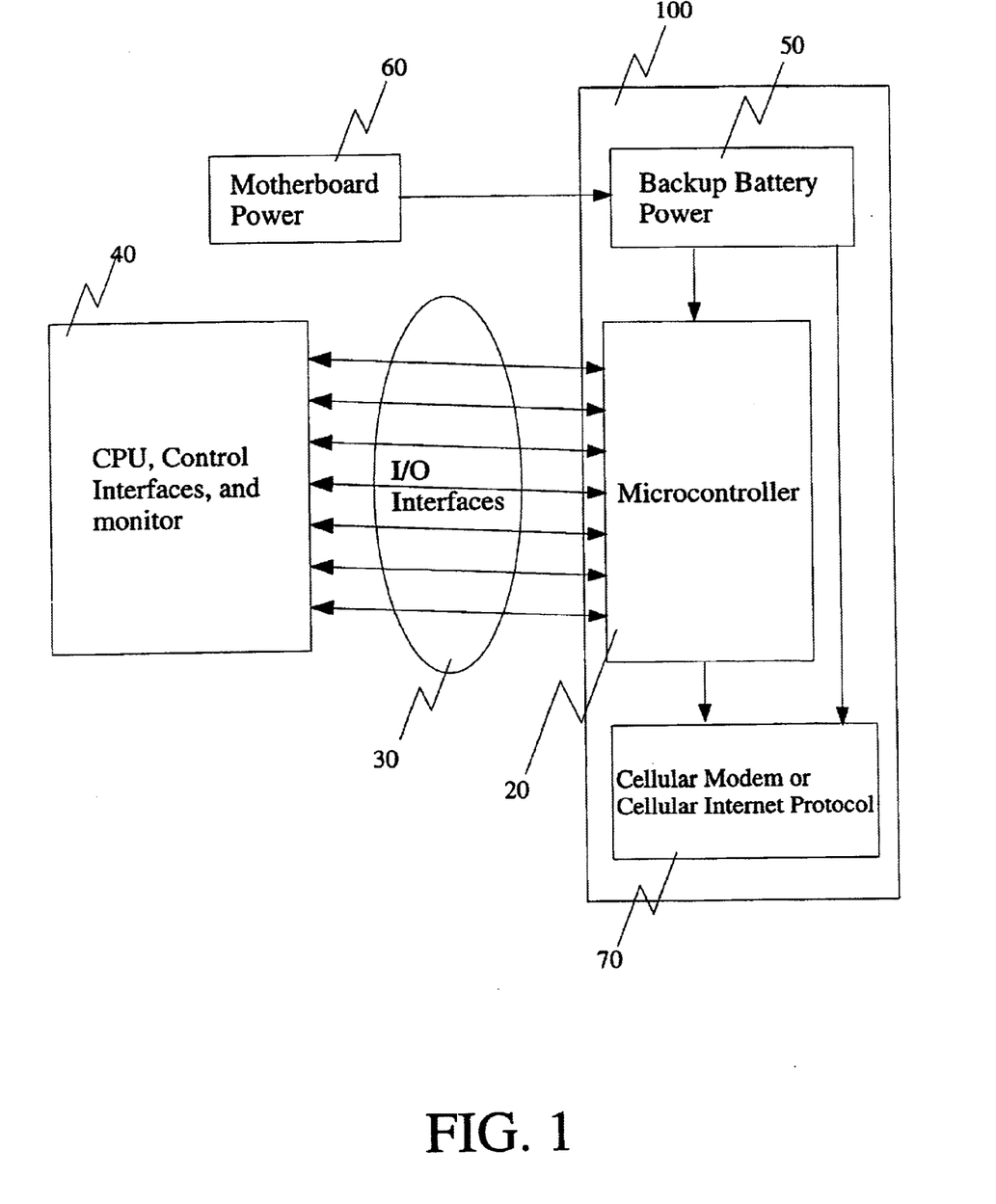
FIG. 1 shows a high level conceptual view of the independent remote computer maintenance device.

Referring now to FIG. 1, the independent remote maintenance computer coupled to a microcomputer, workstation, server or other computer. A microcontroller 20 is connected to the CPU 40 (or host computer) and the other input and output interfaces of the microcomputer 40. The I/O interfaces 30 (i.e. serial, 12C, Ethernet) of the microcontroller 20 are coupled directly to the I/O connections of the host CPU 40 and network. The microcontroller 20 has embedded routines (i.e. text console, slip, or PPP) which control its interface with the CPU 40, or it may load the software interface routines from a ROM associated with the microcontroller.

Figure 2:
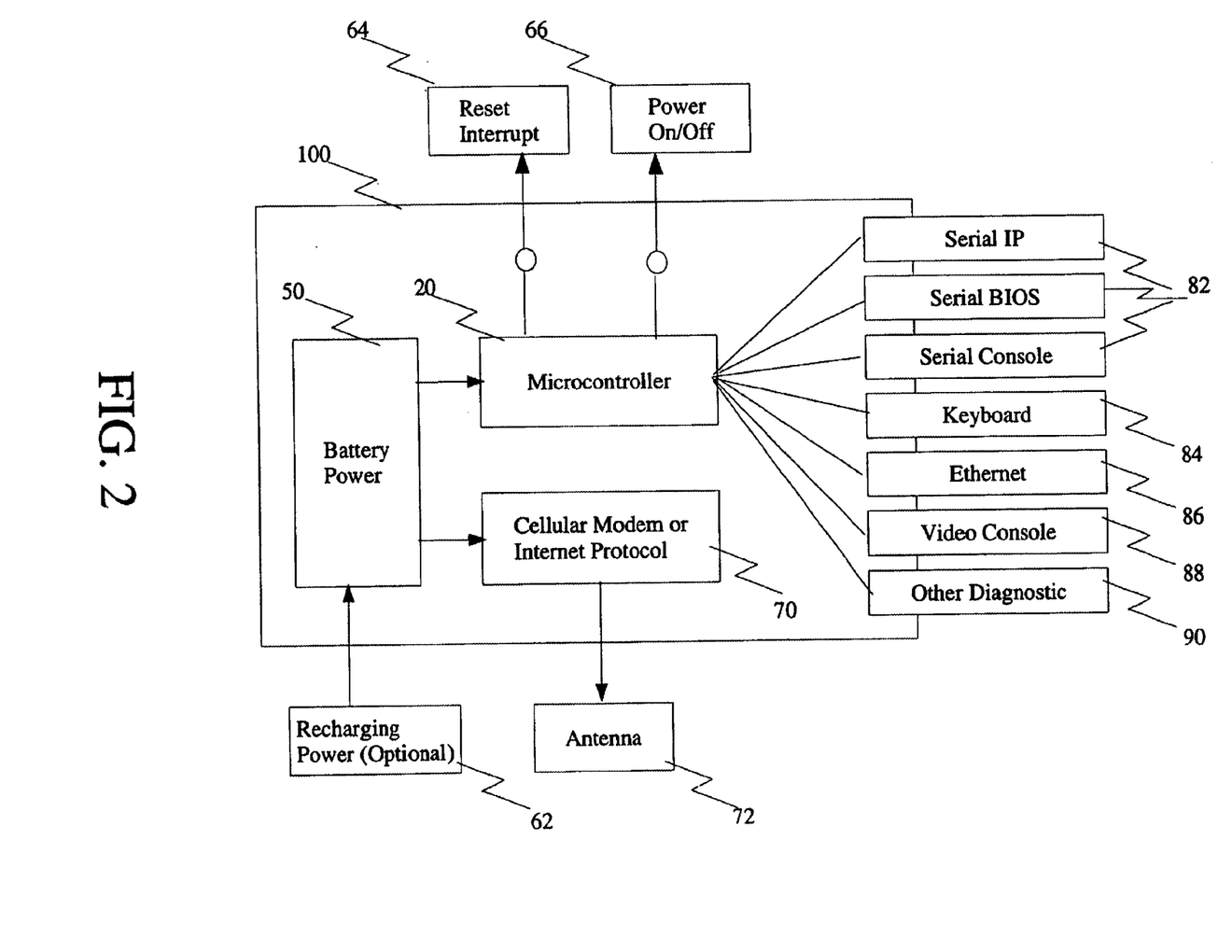
FIG. 2 shows a more detailed interface level block diagram of the remote computer maintenance device of FIG. 1.

As shown in FIG. 2, a very important aspect of this machine is that it provides independent control over the host computer. One of the I/O interfaces of the microcontroller 20 is attached to the power 66 and reset jumpers 64 of the host computer 100. This means that the remote device is able to reset and recycle power without affecting the operation of the independent device. An additional level of control also allows access to the host operating system and BIOS. This additional access may be provided through serial BIOS, serial console, or a video console serializer 82. A level of hardware access may also be added through an 12C interface to hardware such as temperature and fan speed sensors.

FIG. 2 shows an independent remote computer maintenance device which would be mounted on an expansion card 100. Although the maintenance device could be a separate stand alone device near the host computer with connections into the host computer chassis, the preferred method is mounting on an expansion card. The expansion card fits into the chassis of the host computer and slots into an expansion card slot. The major difference between this device and a normal expansion card is that it has no data contacts to the I/O bus. Although, the card may use the power contacts for battery recharging. The printed circuit board card for the maintenance device is a card, sized for ISA, PCI, or other standard slot sizes.

Another element of this invention is the remote monitoring of a host computer. This monitoring includes, but is not limited to, the monitoring of temperature sensors, power supply voltages, motherboard temperatures, processor temperatures and fan speeds. This type of monitoring may be performed by an LM 8x or LM 7x chip manufactured by National Semiconductor (or similar monitoring chips) and may be attached to the host system via an SMB (System Maintenance Bus). These monitoring chips or the previously mentioned Intel device is interfaced to the independent microcontroller 20. Sometimes this information is obtained from the Emergency Management ports or an 12C bus on the motherboard for temperature sensing and fan speeds.

The control and monitoring of the host computer is through the host computer's communication ports. This is vital to the present invention because it supports remote interaction directly with the host, and the interaction can be performed at a number of levels. Perhaps the lowest level is serial port I/O for low-level text access to the BIOS. The independent microcontroller may also access operating system commands and boot logs through the serial port. At a higher level there may be keyboard control and video capture which would allow for direct graphical interaction with the host computer if desired. (The video serializer can be used for text mode serialization too, which is useful for BIOS that are incompatible with a standard serial port.) Often this type of high level graphical interaction will not be possible because of malfunctioning software but it should be available when the problem is not the host computer but it a failure such as a network malfunction appears like a malfunction in the host computer. Access to the graphic interface provides a method of performing even routine maintenance from a remote site. Products such as Citrix for Windows NT and Windows 2000 or X for Unix can create a very low-bandwidth interface for remotely running graphical applications.

Another important maintenance control is the interface to the local network for testing local connectivity. Direct access to the local network helps a technician decide whether the local area network the host computer is connected to is having problems. Network access can also help diagnose problems with routers, firewalls or other local devices protected by internal firewalls which can be pinged from the host computer, but not from outside the LAN. The independent wireless network allows access to the local LAN so the problem can be remotely isolated. If this invention is attached to the server, the connection to the LAN helps determine if the host server is able to address the network or if another network component is producing the problem. LAN access also provides secondary "back door" IP access to the maintenance device.

This invention is hardware independent of the host computer. In other words, the device is totally unaffected by failure of the host CPU, host motherboard, or host power supply. Hardware independence is provided, in part, by the backup battery power 50 shown in FIG. 1. This backup battery could be a long lasting chemical battery or a rechargeable battery. The motherboard power 60 could be used by the microcontroller 20 unless there is a power failure or power down, then the power would default to the backup battery power 50. Alternately, the microcontroller 20 and the cellular modem 70 could consume power exclusively from the battery 50. If the backup battery power 50 is rechargeable, then the motherboard power 60 or power supply can be used to recharge those batteries. Any batteries used must be robust enough to power both the microcontroller and the cellular communication interface in the event of power loss. Another implementation uses long-lasting chemical batteries (fuel cell technology), which are only used when the external power is not available. This provides a battery with an unlimited shelf life.

In the prior art, diagnostic devices are typically interconnected with the host motherboard and host power supply. So, if the motherboard fails or the local power fails, diagnostic tools such as the eBIOS or Emergency Management Port also fail. These onboard error management devices are also subject to software corruption, cross-talk and interference from other onboard electronic devices. Even if the diagnostic device is not directly dependent on the host power supply, it will ultimately be dependent on the power from the physical building, uninterruptible power supply (UPS), or room where the host computer resides. This makes it impossible to determine whether certain failures are due to power failure or computer failure. Even a UPS will fail after 15 or 20 minutes. If a technician is not physically present when the power fails, then the server or microcomputer cannot be shut down normally which is very helpful. In the case where the problem is not known, the independent diagnostic unit can determine if the power has failed even if the UPS has no power.

Another problem with devices such as eBios is they cannot be used to monitor and control the BIOS and the operating system. The present invention can connect to BIOS diagnostics or Emergency Management Ports while they are concurrently monitoring the operating system.

Referring to both FIGS. 1 and 2, it is noted that the remote maintenance interface for this invention includes a wireless cellular modem or a wireless IP packet interface 70. The cellular modem or cellular IP connection 70 is connected to the microcontroller 20 and provides control data for the microcontroller. It should be realized that the wireless connection could also be some other sort of wireless connection such as microwave communications, satellite uplinks or other similar wireless connections. The important part of a wireless connection is its availability when the land based telecommunication lines are not working. For example, if one cellular connection site is down, then access may be routed through a backup cell site. This system makes the independent diagnostic device accessible despite power and telephone loss. Then when a user contacts a technician with problems, the technician can evaluate the status of the host computer even if there is no power or phone connection.

The wireless communications used by this invention should be differentiated from local area wireless networks (short range within a mile or two), tower based broadcast/ unicast (i.e. LMDS), point-to-point spread spectrum, and other short range wireless networks. This invention uses long distance wireless, which is redundant and has global connectivity. Private wireless networks are usually not redundant. Furthermore, even if a short range wireless connection is used then traveling to the site has not been avoided.

Independent access also make it possible to access the remote microcontroller when physical room access is not available. If the host computer is located in an area that is not easily accessible or geographically remote then, accessing the host computer through the cellular modem is very effective. There are cases when land based telephone lines and networks will be unavailable. It is often the case that these two services are provided by the same physical lines by the same utility. For example, if a backhoe cuts the telephone lines (which include the data lines), then the independent remote maintenance device allows a remote technician determine the source of the problem. This avoids a separate trip to the site to determine that the problem is not the host computer nor local network. This diagnostic approach can be used for all of the I/O cards, I/O ports, external network switches and hubs, land-based Internet or telephony lines, and adapter cards. As long as there is a connection to the specific peripheral when a problem occurs, the independent microprocessor can query the selected peripheral.

Figure 3:
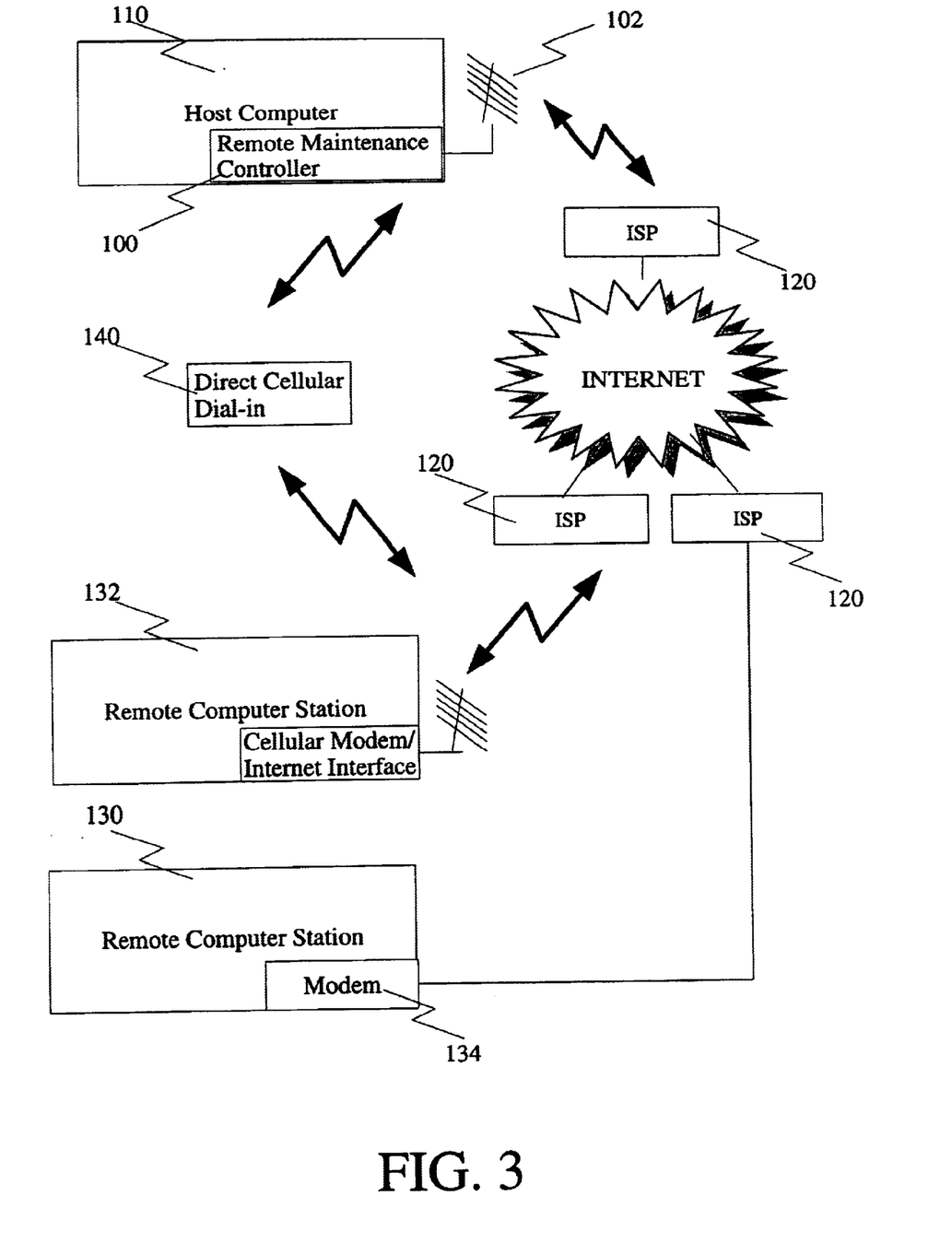
FIG. 3 shows the organization of communications from a remote maintenance controller to a diagnostic computer station.

FIG. 3 shows the organization of communication links from a remote computer station to the maintenance controller. Specifically, the monitored host computer 110 contains the remote maintenance controller or device 100. As described, the remote maintenance device contains a wireless connection 102 that connects to a wireless Internet Service Provider 120 (ISP) or a conventional cell phone provider. The wireless connection to the Internet allows access to the remote maintenance controller 100 from anywhere a remote technician has Internet or standard modem access. One example is a remote computer station 130 which connects to the Internet through a conventional modem 134. Of course, in this scenario, any remote connection to the Internet would suffice. A second example is a remote computer station 132 which dials into an ISP 120 using a wireless connection or standard modem and performs the service required for the host computer 110 The remote technician can then perform diagnostic services anywhere a wireless connection is available. The remote technician can also dial directly into the remote maintenance controller 100 using a direct cell connection 140 or a direct land line to the cell GSM modem connection (not shown). It should be apparent that the remote technician could connect to the Internet using any other type of land based connection (e.g. ISDN, a T1 or DSL) and then access the remote maintenance controller 100.

Another important element of the current invention is its independence from the operating system. Operating system independence means that the remote user interface is not affected by software crashes or corruption which may be present in the host computers hardware. The independence of this invention from the operating system, independent monitoring function and independent control functions of this device provide a stable platform to diagnose and correct problems on a host computer.

Figure 4:
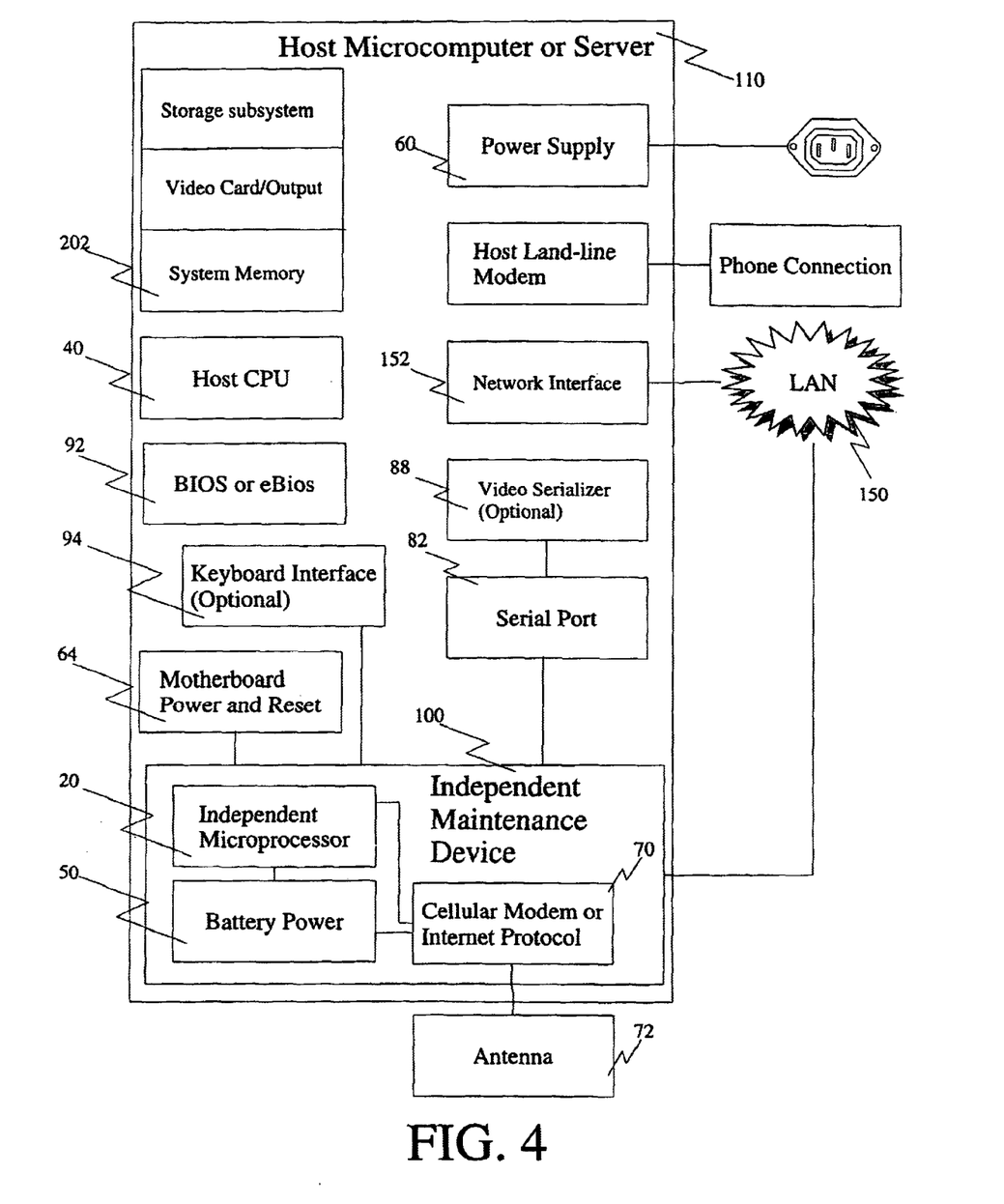
FIG. 4 shows a more detailed block diagram of the independent maintenance controller within the host computer or server of FIG. 3.

FIG. 4 shows an independent maintenance device contained within a host computer 110 containing a host CPU 40 and conventional computer subsystems 202. The microprocessor 20 or microcontroller is the brains of the independent maintenance device. This independent processor 20 may be a general processor combined with a program loadable from a ROM or it may be an application specific integrated chip (ASIC) or field programmable gate array (FPGA) which is preprogrammed. Alternately, the processor could be just a serial multiplexer which would just pass the characters through and have a rudimentary amount of logic to capture special characters for port switching. A serial multiplexer is not the preferred implementation because it does not provide all the desired functionality or logic, but it is a usable chip configuration.

Connected to the microprocessor is a cellular modem or cellular IP (Internet Protocol) connection 70. The wireless connection will have an antennae 72 that extends outside the host computer's chassis. (Also seen in FIG. 2.) The preferred cellular modem is known as a GSM (Global System for Mobile Communication) modem which is a digital mobile telephone system that operates on either a 900 MHz or 1800 MHz band. Another form of wireless communication is a cellular digital packet data (CDPD) system. This is a packet switched wireless system where each packet has an IP address. The packets are transmitted across and routed through the cellular network independently to the Internet, with network protocols managing access, routing, and the prioritizing of packets. These mobile communications have conventionally been reserved for mobile communications or for telemetry (in situations where land lines are not available).

Referring again to FIG. 4, the microcontroller is also connected to the reset interrupt 64 and the power on/off 64 on the host computer's chassis. This allows the technician to connect, using the wireless technology, and reset the computer if necessary. The power may also be reset for a complete reboot if the system does not respond to the hot reset.

When a technician dials in using the wireless technology, the microcontroller 20 is connected to several possible communication links. The most important link is the serial communication link which will generally be through the microcomputer's serial port 82. Through the serial port a character based console interface or serial console can be established. This is especially valuable when the host computer is not booting properly and only a character based interface is presented. Often maintenance is best performed from the lowest level of interaction: a command line character based interface as is available in Novell, Windows 2000, or Unix based console. Using the serial port as a communication link allows character based access to the BIOS 92, or the transfer of IP packets serially. Of course, the independent microprocessor 20 may need specific software to translate the IP or BIOS related information but this can by implemented by those skilled in the art. For example, an FTP (file transfer protocol) link could be set up through the IP transmission.

The microcontroller 20 could also be connected to the keyboard 94 to send keyboard strokes transmitted from a remote location. This way a remote technician can type and then receive the feed back through the serial port 82 or through the video serializer 88 as graphical feedback. Other diagnostic interfaces can also be connected to the microcontroller 20 as needed. The microprocessor 20 is connected to a LAN 150 so it can test Ethernet cards152 or a similar network interface cards as well as hubs, switches, routers, and gateways.

Allowing of the use of IP protocols will enable a remote user to view the graphic interface presented by the computer. In addition, a World Wide Web based interface or browser interface could be presented to the user from the microcontroller 20 which could act as a tiny embedded web server. This would allow the presentation of a graphical view of what the microcontroller has been pre-programmed to test. Again, an onboard rechargeable battery 50 supplies power for the maintenance microcontroller and wireless modem. The self-sustainability and problem solving capability of this invention is the powerful result of the combination of the wireless communications, internal independent power and separate interfaces to the host computer. It should also be realized that this invention is not limited to TCP/IP connectivity, because it could use IPX/SPX and NetBEUI or other well known networking protocols for communication.

The use of the device in practice will now be described. Suppose a user subscribes to an Internet Service Provider (ISP) and they are not able to connect. The user will call and say "the Internet is broken". If it is after hours, the ISP may not be able to pinpoint whether it is the server, power, network, or the telephone. This is a good time to use the independent remote maintenance device. In the past, if the remote service personnel cannot normally "ping" the server, then they do not know what is wrong and need to go on-site. In contrast, even a server that is not responding to the network is not necessarily unable to respond to its console. Restarting the appropriate software subsystem may be all that is necessary to bring the server online, or maybe the system needs to be reset or rebooted. With remote access to the console, disk syncing and other preventative procedures can be accomplished and the server can be brought down and then rebooted without a service technician actually being on-site.

The current invention can also be programmed to automatically detect failures. This is a lower level of trouble shooting and it does not generate automatic error correction, but it does notify the service technician that service is required. Normally, the invention is used for ad-hoc error diagnosis and recovery by a human technician, but there are certain software and hardware failures which can be automatically detected. These are:

1. The "blue screen of death" or an operating system fault displayed on the console.
2. The system is not responding to network pings.
3. The I/O bus (or other bus) is not currently powered.
4. The console boot messages stopped prior to boot completion.
5. The processor is overheating.
6. The power supply fan has stopped.

These situations, as well as user programmable variants, can be continuously monitored.

Most problems cannot be easily categorized. This invention lends itself to "adaptive" administration techniques for problem resolution. In other words, correction of those problems which are best solved from a command line interface. This is where the service personnel must test and analyze the server and the network to determine the fault.

Suppose a customer has a server and that server has a number of possible uses. For example, the server is their firewall gateway to the Internet, their e-mail server, a web-caching server, their intranet server (for in-house information exchange). Other mission critical applications may be their database server, DHCP (Dynamic Host Configuration Protocol) address server, a shared file server, a shared printer server, a Citrix thin applications server, or a fax and copier server.

The customer has a service agreement with XYZ computers to service their server and LAN equipment. XYZ uses the present invention to implement remote servicing of their customer's computers. An alternative name for this device could be a "hot maintenance box" for the sake of this discussion. The customer is using the integrated GSM modem option, rather than CDPD option, due to the local cellular carrier service. The user has programmed the embedded processor for certain failure auto-detect conditions, but has not received any messages recently from this machine.

The customer calls XYZ and says our Internet connection is not working. The service person first "pings" the server and gets no response. Rather than sending out a service person, he dials into the "hot maintenance box". Depending how it was setup, it either offers a PPP (Point to Point Protocol for transmitting serial IP packets) connection or a raw terminal shell. Either communication option is secured via a password.

Once logged in, the service technician can do any of a number of things. First, the user could inspect the server console to see if there are any helpful messages on the serial console or video-to-serial console. The "hot maintenance box" has many serial ports that continuously monitor such devices. Such console messages might include "panic" or error messages from a failed Unix operating system, or a system fault from a Windows server.

In such a case, the host logs saved by the "hot maintenance box" may give clues as to the reason for failure. Then service technician commands either a reset or power cycle. The "hot maintenance box" can be instructed can do either. If a reset is desired, then the appropriate connections are triggered on the power supply or motherboard. The power might be shut off and turned back on if the reset didn't work, or if the nature of the error indicated a hardware failure or overheating.

If the host system has not obviously failed, the service technician can log into the host's console to either a command prompt or PPP session. Once logged in, the operator can view the active running subsystems and determine if some subsystem is currently causing problems. If a specific sub-system with problems is located then that subsystem can be restarted. In the alternative, it is possible to just stop the failed subsystem and let other subsystems run. The service person can also inspect the event logs for hints. For the worse case, the operator can perform a controlled shutdown and see if that fixes the problem.

Before doing that, the "hot maintenance box" has a LAN (e.g. Ethernet) connection that can be used to ping the server from within the LAN. This is assuming we've already determined that the server is not pingable from outside the LAN. Possibly, other computers in the LAN respond, but the server does not. In this case, we know the server responds to the console but not the network. This leads to the diagnosis that either the network card has failed, or the network kernel drivers are malfunctioning. The solution to fix this problem is to reset the power (following a controlled shutdown), which we can do from the "hot maintenance box".

Possibly, the other machines in the LAN aren't responding, now we can suspect the network switch or router. Many network switches and routers have a serial console, where a user can log in and reset it across the network. Sometimes, switch or router problems are due to lost settings, and we can change the settings on the switch through the serial interface. This communication can be performed over the network or if the network device is physically close to the "hot maintenance box" then a cable serial link may be provided.

Then suppose while rebooting the server, it doesn't finish booting due to file system corruption or malfunctioning hardware. In the case of file system corruption, the operator can fix the file system. When the hardware has malfunctioned, the operator now knows exactly what hardware needs to be serviced even though he has not been on-site yet.

Another possible scenario is once logged into the "hot maintenance box" the service technician sees that the invention is currently running on battery backup, and re-powering the server does not turn it on. Then the service person can, ask the users to check their electrical breakers. In another situation the server and LAN look fine, but the Internet cannot be accessed. Then the service technician can ask them to check with their Internet Service Provider (ISP).

In summary, the method for the invention is remotely maintaining computer hardware and software in a host computer system. The first step is providing an independent, self contained diagnostic processor having a wireless communication connection and an independent power source. Second, the diagnostic processor is coupled to the host computer to receive status data about the present state of the hardware or software. Next, the data is transmitted through a wireless communication connection to a remote computer which displays the information. Then the final step is sending commands from the remote computer back to the diagnostic processor to analyze and control the host computer.

Without a remote service interface, the customer has to be the remote eyes and fingers for the service technician. This process can be slow, frustrating and maybe impossible, especially when the customer is not technically trained. This invention as described overcomes the limitations of phone line support. Furthermore, this invention allows for diagnosis and problem solving even when the power is out or when the host computer is not able to connect to land based telecommunications systems.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A remote maintenance computing device for monitoring a host computer's hardware and software, comprising:
    a) a plurality of communication interfaces connected to the host computer;
    b) a microprocessor coupled to the communication interfaces to monitor the host computer and associated peripherals;
    c) a wireless communication connection coupled to the microprocessor to transmit data regarding a present state of the host computer's hardware and software;
    d) an independent power source wired to the microprocessor and wireless communication connection, wherein the independent power source is independent from the host computer; and
    e) a remote computer to receive the data transmitted by the wireless communication connection and to transmit commands to the microprocessor through the wireless communication connection.

2. The device as in claim 1, wherein the wireless communication connection is a cellular modem.

3. The device as in claim 1, wherein the wireless communication connection is an Internet Protocol packet broadcasting device.

4. The device as in claim 1, wherein the wireless communication connection is a satellite link.

5. The device as in claim 1, wherein the independent power source is a battery.

6. The device as in claim 5, wherein the battery which is recharged by the host computer.

7. The device as in claim 1, wherein the plurality of communication interfaces further comprises a serial input and output port for low-level text access to the basic input and output functions of the host computer.

8. The device as in claim 7, wherein the plurality of communication interfaces further comprises emergency management ports and system maintenance busses which monitor temperature, motherboard voltage and fan speed of the host computer.

9. The device as in claim 7, wherein the plurality of communication interfaces further comprises toggle interfaces with motherboard jumpers.

10. The device as in claim 7, wherein the plurality of communication interfaces further comprises keyboard emulation.

11. The device as in claim 1, wherein the plurality of communication interfaces further comprises an independent serial Internet Protocol connection.

12. The device as in claim 1, further comprising a network connection attached to the microprocessor to allow for testing of a network that is connected to the host computer.

13. The device as in claim 12, wherein the network can be a local area network and a wide area network.

14. The device as in claim 1, wherein the plurality of communication interfaces further comprise a video capture interface, coupled to the microprocessor, to collect data regarding the host computer.

15. The device as in claim 1, wherein the remote computer further includes a serial console emulation device to enable command line maintenance.

16. The device as in claim 15, wherein the remote computer further includes a graphical interface to graphically view the host computer's hardware and software status.

17. The device as in claim 1, wherein the remote computer further includes a web browser interface to the microprocessor.

18. The device as in claim 1, wherein the independent power source is fuel cell.

19. A remote maintenance computing device for monitoring computer hardware and software, comprising:
    a) a host computer having hardware, basic input and output systems, and an operating system;
    b) a plurality of communication interfaces, connected to the host computer and network devices;
    c) an independent microprocessor, coupled to the communication interfaces, designed to monitor the status of the hardware and operating system and provide remote commands to the host computer;
    d) a wireless communication connection, coupled to the microprocessor, configured to transmit data from the microprocessor regarding a present state of the host computer's hardware and software;
    e) an independent power source wired, to the microprocessor and wireless communication connection, wherein the independent power source is independent from the host computer; and
    f) a receiver to receive and display the data transmitted by the wireless communication connection and to transmit commands to the microprocessor through the wireless communication connection.

20. A method for remotely maintaining computer hardware and software in a host computer system, comprising the steps of:
   a) providing an independent, self contained diagnostic processor having a wireless communication connection and a power source, wherein the power source is independent from the host computer;
   b) coupling the diagnostic processor to the host computer to receive data about a present state of hardware or software;
   c) transmitting the data through a wireless communication connection to a remote computer that displays the data; and
   d) sending commands from the remote computer back to the diagnostic processor to analyze and control the host computer.

21. The method of claim 20 further comprising the step of repeating steps c) and d) until a problem in the host computer has been corrected.

22. The method of claim 20, wherein step (c) further comprises the step of logging into the diagnostic processor from the remote computer using a serial IP connection.

23. The method of claim 20, wherein step (c) further comprises the step logging into the diagnostic processor from the remote computer using a terminal shell.

24. The method of claim 20, wherein step (c) of sending commands further comprises the step of sending a reset command if the system has failed.

25. The method of claim 20, wherein step (c) further comprises the step of sending a power down and restart command if the system has failed.

26. The method of claim 20, wherein step (d) further comprises the step of transmitting the data through a cellular modem connection.

27. The method of claim 20, wherein step (d) further comprises the step of transmitting the data through a satellite IP packet connection.

28. The method of claim 20, wherein step (d) further comprises the step of transmitting the data through a cellular Internet Protocol connection to the diagnostic processor.

29. The method of claim 20, wherein step (b) further comprises the step of coupling the diagnostic processor to the host computer's video output.

30. The method of claim 20, wherein step (b) further comprises the step of coupling the diagnostic processor to the host computer's serial basic input and output system (BIOS).

31. The method of claim 20, wherein step (b) further comprises the step of coupling the diagnostic processor to the host computer's temperature, power, and heat sensors.

* * * * *